United States Patent
Bruggemeier et al.

(10) Patent No.: US 7,933,386 B2
(45) Date of Patent: Apr. 26, 2011

(54) INTERACTIVE HOSPITALITY SYSTEM

(75) Inventors: Wolfgang Bruggemeier, Delbruck (DE);
Gerlinde Kuhnel-Mathe, Maisach (DE); Bernd Solow, Kleinmachnow (DE); David Leonhard Steinbauer, Berlin (DE); Jurgen Totzke, Poing (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 0 days.

(21) Appl. No.: 12/789,846

(22) Filed: May 28, 2010

(65) Prior Publication Data
US 2010/0259382 A1  Oct. 14, 2010

Related U.S. Application Data

(62) Division of application No. 12/041,235, filed on Mar. 3, 2008, now abandoned.

(60) Provisional application No. 60/904,300, filed on Mar. 1, 2007.

(51) Int. Cl.
H04M 11/04 (2006.01)
H04M 11/00 (2006.01)
G08B 23/00 (2006.01)
H04L 29/06 (2006.01)
H04N 7/10 (2006.01)
H04N 7/025 (2006.01)

(52) U.S. Cl. ........... 379/51; 379/40; 379/41; 379/45; 379/48; 379/52; 340/573.1; 455/404.1; 455/414.3; 725/33; 725/34; 725/35

(58) Field of Classification Search .......... 340/506, 340/509, 517, 521, 524, 525, 573.1, 686.1, 340/686.6; 379/39–45, 47–49, 51, 52; 455/414.1–414.4, 456.1, 456.3, 456.5, 456.6, 457; 725/34, 35
See application file for complete search history.

(56) References Cited

U.S. PATENT DOCUMENTS

| | | | | |
|---|---|---|---|---|
| 5,428,345 | A | * | 6/1995 | Bruno ............... 340/541 |
| 5,784,456 | A | * | 7/1998 | Carey et al. ........... 379/419 |
| 6,154,130 | A | * | 11/2000 | Mondejar et al. ...... 340/521 |
| 6,762,686 | B1 | * | 7/2004 | Tabe ................... 340/573.1 |
| 6,809,642 | B1 | * | 10/2004 | Brenner ................ 340/506 |
| 6,985,070 | B1 | | 1/2006 | Parker |
| 7,181,441 | B2 | * | 2/2007 | Mandato et al. ........... 1/1 |
| 7,356,139 | B2 | | 4/2008 | Turcan et al. |
| 7,522,035 | B2 | * | 4/2009 | Albert ................ 340/521 |
| 7,688,952 | B2 | * | 3/2010 | Light et al. ........... 379/42 |
| 7,706,904 | B2 | * | 4/2010 | Jones et al. ............ 700/94 |
| 2002/0128926 | A1 | * | 9/2002 | Ohrn ..................... 705/26 |
| 2003/0149576 | A1 | | 8/2003 | Sunyich |
| 2004/0083128 | A1 | * | 4/2004 | Buckingham et al. .... 705/10 |
| 2004/0117828 | A1 | | 6/2004 | Parker et al. |
| 2005/0212677 | A1 | * | 9/2005 | Byrne et al. .......... 340/574 |
| 2005/0283791 | A1 | | 12/2005 | McCarthy et al. |
| 2007/0038570 | A1 | | 2/2007 | Halbritter et al. |

(Continued)

FOREIGN PATENT DOCUMENTS

DE        3402455  A  *  8/1985

(Continued)

*Primary Examiner* — Crystal J Barnes-Bullock
(74) *Attorney, Agent, or Firm* — Buchanan Ingersoll & Rooney PC

(57) ABSTRACT

A hospitality system has at least one database for storing guest preferences regarding environment variables, for storing a national and/or regional origin or personal attributes of the guest. According to embodiments, advanced evacuation systems and entertainment systems are provided which fit the guest's preferences and origin.

7 Claims, 1 Drawing Sheet

U.S. PATENT DOCUMENTS

| | | |
|---|---|---|
| 2007/0049259 A1* | 3/2007 | Onishi et al. ............... 455/414.2 |
| 2007/0226019 A1* | 9/2007 | Carlson et al. .................... 705/5 |
| 2007/0293955 A1* | 12/2007 | Yamashita et al. .............. 700/28 |
| 2008/0046930 A1 | 2/2008 | Smith et al. |
| 2008/0228532 A1 | 9/2008 | Gengarella et al. |

FOREIGN PATENT DOCUMENTS

| | | | |
|---|---|---|---|
| JP | 08297794 | A * | 11/1996 |
| JP | 2005202699 | A * | 7/2005 |
| JP | 2007050173 | A * | 3/2007 |
| JP | 2008042320 | A * | 2/2008 |

* cited by examiner

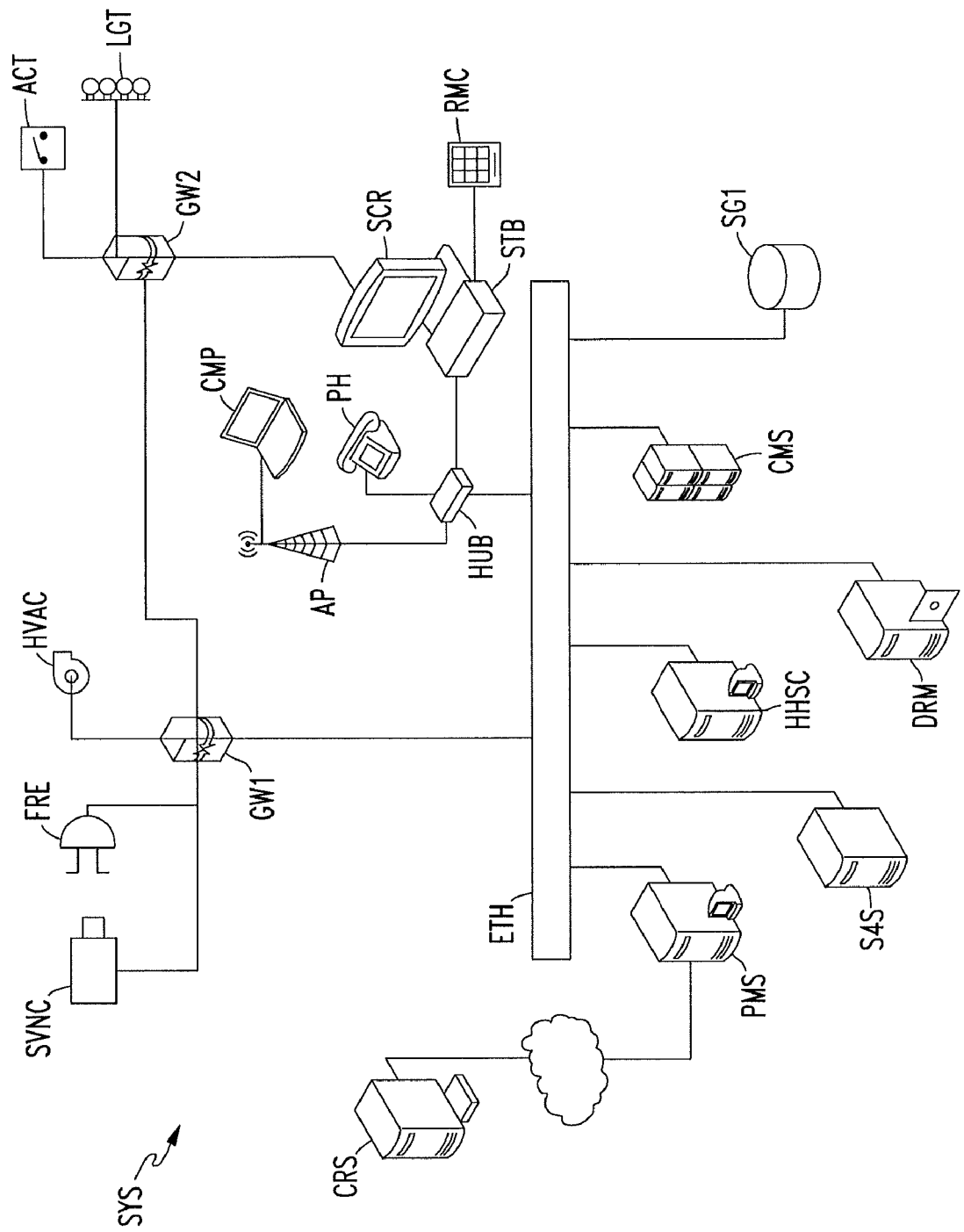

INTERACTIVE HOSPITALITY SYSTEM

This application is a divisional of U.S. patent application Ser. No. 12/041,235, filed Mar. 3, 2008, and claiming priority to U.S. Provisional Application No. 60/904,300, filed Mar. 1, 2007.

FIELD OF THE INVENTION

The present invention relates to a hospitality system and more particularly to an entertainment and messaging system used in hotels.

BACKGROUND OF THE INVENTION

Today's hospitality systems usually support a subscription of video or audio information like movies, music etc. which are displayed by an in-room screen or played by in-room loudspeakers.

A disadvantage of current prior art hospitality systems is the limited way to deal with preferences of individual guests regarding the lighting of the guest's room, temperature etc.

Yet another disadvantage of known hospitality systems is that an identical selection of information and entertainment contents is offered to all guests. Every guest is encountered by a bulk of selectable entertainment media and other contents which will limit the usability of selecting media in the guest's sphere of interest.

A further disadvantage of known hospitality systems is the limited manner to report alarm situation to guests and to effectively guide personnel and guests in the case of an evacuation.

SUMMARY OF THE INVENTION

A hospitality system has at least one database for storing guest data.

In one aspect, a hospitality system comprises a plurality of sensors in a guest room assigned to a guest for reporting environment variables of the guest room, at least one database for storing guest preferences regarding environment variables whereby the guest preferences are stored related to the time of day, at least one control gateway for receiving environment variables and for adjusting a plurality of actuators in the guest room, a central server configured to record adjustments of the environment variables and adapted to read the guest preferences regarding environment variables from the database and to send the guest preferences to the at least one control gateway.

Thus one problem with existing hospitality systems can be overcome. The new hospitality system allows an automated way to deal with preferences of individual guests regarding the lighting of the guest's room, temperature etc.

In another aspect, a hospitality system comprises at least one database for storing guest preferences data whereby the guest preferences are stored related to personal attributes of the guest, an entertainment system adapted to offer media to the guest whereby the offered media selection is presented by a selectable list, a central server configured to read the guest preference data and guest attributes from the database the server being configured to derive contents of the selectable list and an order of entries in said list taking into account the guest preference data and guest attributes.

Thus one problem with existing hospitality systems can be overcome. The new hospitality allows an automated way to deal with preferences of individual guests regarding entertainment or information media selectable by the entertainment system. An individual program is offered to every individual guest based on a guest preference recorded before and/or based on guest attributes.

In yet another aspect, a hospitality system comprises an emergency system. The emergency system may include an alarm and/or an evacuation system. By storing the origin of the guest at least one database, an alarm of the emergency system may be individually announced in each guest room by taking into account the origin of the guest.

Thus one problem with existing hospitality systems can be overcome. The new hospitality allows an adapted manner to report alarm situation to guests having a different origin. The origin may include for example the national origin of the guest such as Germany or United States. The origin may include a region of the guest for example a state such as New York or Barvaria in Germany. Thus, the origin may help to identify a language and/or dialect of the guest.

In yet another aspect, a hospitality system comprises an emergency system to detect and/or to report an alarm situation, a plurality of sensors in a guest room configured for detecting a human presence in said guest room and a central server configured to report each guest room with a human presence to the alarm and evacuation system.

Thus one problem with existing hospitality systems can be overcome. The new hospitality allows to effectively guide rescue personnel to guests still remaining in their guest rooms in the case of an evacuation.

BRIEF DESCRIPTION OF THE DRAWINGS

The sole FIGURE shows a block diagram of a general embodiment of an interactive hospitality system.

DETAILED DESCRIPTION OF THE INVENTION

The following description is presented to enable one of ordinary skill in the art to make and use the invention. Various modifications to the preferred embodiment will be readily apparent to those skilled in the art and the generic principles and features described herein may be applied to other embodiments. Thus the present invention is not intended to be limited to the embodiment shown but is to be accorded the widest scope consistent with the principles and features described herein.

Referring now to the FIGURE, what is shown is a hospitality system according to one embodiment of the invention. In the following discussion the present invention will be discussed in the context of a hotel system. It should be understood however that there are other types of hospitality systems such as resorts, senior residences, hospitals, educational institutions, cruise ships, pleasure boats, casinos or the like where the principles of the present invention would apply.

A hospitality system SYS provides the guests with entertainment (including TV, Video on Demand (VoD), gaming, network access, and communication (telephony and voice mail services).

Within a hotel, there are other infrastructures in place for room and building control, alarm management, lighting as well as all kinds of actuators ACT. These infrastructures are based on different industry standard busses, system specific devices and device control entities. Frequently, these infrastructures, that had been installed to provide guest convenience, are even not recognized or cannot be operated by the guest and, thus, do not provide comfort to that extent it has been deployed for. The investments of the hotel cannot be fully returned, e.g. in terms of guest loyalty.

A majority of the components described below are connected via a network interface ETH. The network interface ETH is preferably designed as an Ethernet type network comprising usual components like switches (not shown), routers (not shown), and patch panels (not shown).

A Central Reservation System CRS offers room contingents to external sales channels. It operates on very simple records like room category, smoker/non-smoker, and availability.

A Premises Management System PMS provides front-office and back-office services along the hotel guest stay life-cycle like check-in, check-out, access control, billing, etc.

A Hospitality Service Centre HHSC extends the functionality of the Premises Management System PMS by integrating personalized Communication Services like telephony and messaging service reaching from simple voice mail services to up-to-date unified messaging services. Furthermore it provides hotel staff workflow support and service tracking.

A Content Management Server CMS provide for packet-orientated television, or, IP-TV (Internet Protocol), Video-on-Demand, vicinity services, e-reading, gaming etc. In order to protect some contents against unauthorized duplication, the Content Management Server CMS interacts with a Digital Right Management DRM system.

Different infrastructures within the building are in place to control and access different appliances like Video Surveillance SVNC, Fire Alarm and Evacuation systems FRE as well as Heating, Ventilation, and Air Conditioning WAC. These systems are usually using industry bus systems like Instabus™ or Apogee™. By usage of actuators ACT, further entities within a room can be controlled, like curtains or blinds.

The system SYS further allows intelligent control of lighting LGT, e.g. for activation of different light-scenarios: switch on or off, dimming and optional control of color LED devices (not shown).

The system SYS is controlled by a central server S4S.

A basic principle of system SYS is a consolidation of different bus systems by means of IP-infrastructures at building or floor level that eliminates the need for proprietary bus systems and, thus, provides for significant cost savings.

The user interface consists of a Set-Top Box STB, a Remote Control RMC and a Screen Display SCR. Additional services are made available by an IP-phone PH, which is optionally equipped with a large display.

A hub HUB is connected to the network interface ETH in order to operate as a termination point for communication demand of the guest. The hub HUB is connected to a wireless access point AP to provide internet services like WLAN or IP-telephony to the guest. As shown in the FIGURE, a guest's computer CMP can be connected in a wireless manner to the access point AP.

The Set-Top Box STB can alternatively operate as a termination point for internet services like WLAN or IP-telephones. This is beneficial if a network cabling infrastructure is not available, e.g. in renovated hotels where twisted pair copper with DSL or cabling infrastructures will be reused instead of network cables.

A major principle of the system SYS described herein is a usage of a scheme which is referred to as Single Guest Image SGI. This scheme provides guest individual preferences that will be applied to a room when the guest has checked-in or some time before. The Single Guest Image scheme cooperates with a database SGI containing the data of each registered guest. The Single Guest Image scheme can be operated by a single hotel or by a central server in the case of a hotel chain. In the latter case data of a guest is transferred upon a remote registration of the guest and updated to the individual hotel during check-in.

Guest preferences are derived from the guest data stored in the database SGI. Information and entertainment contents offered by the system SYS are presented according to attributes stored in combination with the guest data, e.g. type of traveler (business or leisure traveler), gender of the guest, age, marital status, nationality etc.

Other guest preferences are either encountered by the hotel's personnel or expressed by the guest. The preferences may include information about eating habits like favorite dishes, preference for vegetarian food etc. Other preferences include a guest data history like a loyalty level of the guest. The guest preferences are stored in the data base SGI and kept for future stays in the same or in another hotel within the same chain or organization.

Taking into account the guest preferences and other guest data the program of the entertainment system will be adapted in terms of order of offered media, selection of offered media. Some few examples of such an adaptation are e.g. a limited selection of films for families having children, an adaptation of the channels in the TV program according to the nationality of the guest so that programs in the guest's native language have the top position in the order of offered channels.

Special offers may be triggered by considering guest attributes. These offers may include a flat rate for business travelers or a babysitter for families with children in a certain age.

In addition, vicinity information like nearest golf club, sight-seeing offers, museum etc. may be presented according to records of the guest's interests.

On registering a person at the Central Reservation System CRS, the reservation will be transferred by the Premises Management System PMS to the Hospitality Service Centre HHSC. If the person has been guest and her or his data has been recorded in any hotel within the hotel chain before, the respective data will be transferred from a (not shown) central database to the Hospitality Service Centre HHSC. If the registering person has not been a guest of the hotel chain before the guest data are derived from the person's entry in an internet portal offered by the Hospitality Service Centre HHSC. During the check-in of the guest, the hotel's personnel may add additional data of the guest.

Next, a Fire Alarm and Evacuation System FRE according to a further embodiment of the invention will be described.

In the event that a fire alarm or another emergency alarm is triggered by the Fire Alarm and Evacuation systems FRE it is desirable that the hotel personnel has assured information of which individual guest has recognized the alarm and has left his room and which guest has not. Currently, there are only limited methods to determine which guests have been already escaped from their rooms in the event of an evacuation. These limited methods are basically based on calling each guest by an individual telephone call and registering guests which are still in their rooms.

The Fire Alarm and Evacuation systems FRE are improved by announcing the evacuation and asking the guest to confirm the evacuation order. The guest is asked to confirm that she or he will be leaving the room. The confirmation may be done, for example, by pressing a button on the Remote Control FMC. This enables the system SYS of automatically registering all evacuated guests.

Alternatively, one ore more presence sensors may be located in a guest room. Theses sensors are adapted to detect a presence of a human being in said guest room. If a guest leaves the guest room after an alarm situation was announce, the confirmation of the evacuation order is triggered automatically. The confirmation is transferred to the central server S4S of the system SYS.

The Fire Alarm and Evacuation systems FRE are improved by announcing an evacuation order in the language of the respective guest's native language. As sirens differ in different countries or nations, the Fire Alarm and Evacuation systems FRE are further improved by adapting the siren sound to the regional or national customs of the guest. Information about the nationality and/or regional descent of the guest are derived from the guest data.

The Fire Alarm and Evacuation systems FRE are improved by suspending all entertainment programs in the event of an emergency and displaying warnings and/or evacuation plans on the screen SCR instead. All relevant information about the emergency is announced by (not shown) audio systems in the language of the respective guest's native language.

Additionally or optionally, all telephones are changed into a ringing state in the case of an emergency alarm. On picking up the phone the guest is hearing the emergency announcement. The guest may confirm that she or he will be leaving the room by pressing a respective telephone button. If a guest is again picking up the phone after this confirmation, the guest will be automatically transferred to personnel in order to give her or him further guidance in respect of the emergency.

Next, an automatic environment parameter adjustment method according to a further embodiment of the invention will be described.

The automatic environment parameter adjustment method uses guest preference data provided by the Single Guest Image SGI. A profile with environment parameters is stored for each guest. The environment parameters include the lighting preferences of the guest (e.g. dimmed, well lit), temperature preferences (e.g. adjustment of the air condition), etc.

Since these preferences may change during the day, the guest preference data are optionally related to the time of day.

The automatic environment parameter adjustment method is applied to the guest's room when the guest has checked-in or on entering the room. Before that point of time, the environment parameter adjustment method may be advantageously adapted to an energy saving mode.

Manual adjustments of the environment parameters like dimming the light, decreasing the temperature are recorded by the control gateways GW1, GW2 and stored in the database SGI.

Manual adjustments are supported in a comfortable way by providing a night adjustment, which causes all parameters to be changed to a night configuration. The night configuration includes a shaded light, a decreased temperature etc. The night adjustment state can be activated by, for instance, pressing a single >>Good Night<< button at the remote control RMC.

Advantageously, a person who is willing to become a guest and subscribing at an internet portal of the hotel, is able to adjust the environment parameters at this portal.

The automatic environment parameter adjustment method is implemented by the following exemplary embodiment. On registering a person at the Central Reservation System CRS, the reservation will be transferred by the Premises Management System PMS to the Hospitality Service Centre HHSC. If the person has been guest and her or his data has been recorded in any hotel within the hotel chain before, the respective data will be transferred from a (not shown) central database to the Hospitality Service Centre HHSC. If the registering person has not been a guest of the hotel chain before the guest data are derived from the person's entry in an internet portal offered by the Hospitality Service Centre HHSC. The environment parameters adjustment are read from the database SGI by the central server and applied to the guest's room after the guest has checked-in or on entering the room by sending commands to the control gateways GW1, GW2 which are controlling respective actuators ACT, light LGT and/or the air condition system HVAC.

On check-out or, alternatively, periodically, the manual adjustments of environment parameters by the guest are transferred to the database SGI where a time-based record is added to the guest profile.

Although the present invention has been described in accordance with the embodiments shown in the FIGURE, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined solely by the appended claims.

The invention claimed is:

1. A hospitality system, comprising:
   at least one database storing an origin of a respective guest;
   an emergency system individually announcing an alarm in each guest room by taking into account the origin of the respective guest; and
   a central server that automatically directs a phone call to each guest room whereby an alarm announcement is announced by a spoken announcement and whereby the language of the announcement is adjusted to the origin of the respective guest.

2. The hospitality system as claimed in claim 1 wherein the origin is selected from the group consisting of national origin, regional origin and combinations thereof.

3. The hospitality system as claimed in claim 1 wherein the alarm is announced by a siren and whereby the sound of the siren is set to a standardized siren sound of the origin of the respective guest.

4. The hospitality system as claimed in claim 1 further comprising an entertainment system that displays an evacuation plan on a screen in the respective guest room wherein said plan is adapted to a location of the guest room.

5. The hospitality system as claimed in claim 1 wherein the emergency system detects an alarm situation resulting in the alarm announcement.

6. The hospitality system as claimed in claim 1, wherein a confirmation from the guest is requested by the central server such that the guest confirms having received the announcement.

7. The hospitality system as claimed in claim 1, wherein the central server reports guest rooms with a human presence to a rescue center.

* * * * *